US012386230B1

(12) United States Patent
Yang et al.

(10) Patent No.: US 12,386,230 B1
(45) Date of Patent: Aug. 12, 2025

(54) LIGHT REGULATION AND CONTROL SCREEN, LIGHT REGULATION AND CONTROL SYSTEM AND LIGHT REGULATION AND CONTROL METHOD (71) Applicant: Zhejiang University, Zhejiang (CN)

(72) Inventors: Zongyin Yang, Zhejiang (CN); Yinpeng Chen, Zhejiang (CN); Yaqi Shi, Zhejiang (CN)

(73) Assignee: Zhejiang University, Zhejiang (CN)

( * ) Notice: Subject to any disclaimer, the term of this patent is extended or adjusted under 35 U.S.C. 154(b) by 0 days.

(21) Appl. No.: 18/866,622

(22) PCT Filed: Nov. 15, 2023

(86) PCT No.: PCT/CN2023/131824
§ 371 (c)(1),
(2) Date: Nov. 18, 2024

(87) PCT Pub. No.: WO2025/035629
PCT Pub. Date: Feb. 20, 2025

(30) Foreign Application Priority Data

Aug. 16, 2023 (CN) .......................... 202311030728.4

(51) Int. Cl.
G02F 1/139 (2006.01)
G02F 1/167 (2019.01)
G02F 1/1685 (2019.01)

(52) U.S. Cl.
CPC ............ G02F 1/1391 (2013.01); G02F 1/167 (2013.01); G02F 1/1685 (2019.01)

(58) Field of Classification Search
CPC ....... G02F 1/1391; G02F 1/167; G02F 1/1685
See application file for complete search history.

(56) References Cited

U.S. PATENT DOCUMENTS

2010/0053117 A1 3/2010 Ishii et al.
2019/0293981 A1 9/2019 Liao et al.
2023/0176436 A1* 6/2023 Li ..................... G02F 1/133362
349/12

FOREIGN PATENT DOCUMENTS

CN 108828821 A 11/2018
CN 109932834 A 6/2019
(Continued)

OTHER PUBLICATIONS

China National Intellectual Property Administration, International Search Report, Application No. PCT/CN2023/131824, mailed May 16, 2024, 4 pages.

(Continued)

Primary Examiner — Donald L Raleigh
(74) Attorney, Agent, or Firm — ZIEGLER IP LAW GROUP, LLC.

(57) ABSTRACT

The present invention relates to a light regulation and control screen, its system and method thereof. The light regulation and control screen includes a first conductive structure, a second conductive structure, a light response structure disposed between the first and the second conductive structure, and a bistable display structure disposed between the first and the second conductive structure and located on one side of or inside the light response structure. The method has low power consumption and extremely fast response rate, by using the electrical property of the light response structure for color rendering and erasing. Only the area irradiated by light can be in a conductive state to realize a selective erasing, while other areas of the light response structure are still insulated. The present invention does not need complex circuit designs and additional sensing structures, and it is convenient for manufacturing large-size screens and promoting wide applications.

9 Claims, 3 Drawing Sheets (56) References Cited

FOREIGN PATENT DOCUMENTS

| | | | |
|---|---|---|---|
| CN | 110297371 | A | 10/2019 |
| CN | 112684618 | A | 4/2021 |
| CN | 214151299 | U | 9/2021 |
| CN | 113741078 | A | 12/2021 |
| CN | 114546169 | A | 5/2022 |
| CN | 115047686 | A | 9/2022 |
| CN | 115616802 | A | 1/2023 |
| JP | 2008122733 | A | 5/2008 |

OTHER PUBLICATIONS

China National Intellectual Property Administration, Written Opinion, Application No. PCT/CN2023/131824, , mailed May 16, 2024, 4 pages.
China National Intellectual Property Administration, Notification of Granting Invention Patent Application, Application No. 202311030728.4, mailed Aug. 1, 2024, 3 pages, English Translation, 3 pages.
China National Intellectual Property Administration, Second Office Action, Application No. 202311030728.4, mailed Jul. 16, 2024, 5 pages, English Translation, 5 pages.

* cited by examiner

LIGHT REGULATION AND CONTROL SCREEN, LIGHT REGULATION AND CONTROL SYSTEM AND LIGHT REGULATION AND CONTROL METHOD

TECHNICAL FIELD

The present invention relates to the technical field of multi-stable display, and in particular to a light regulation and control screen and a preparation method thereof, a light regulation and control system, and a light regulation and control method.

BACKGROUND

Compared with traditional LCD display technology, the bistable display technology (such as electronic ink screens, LCD handwriting boards, and LCD blackboards) only consumes energy when the display content is changed, thereby significantly reducing power consumption. In addition, since the bistable display technology basically relies on reflected light, there is no blue light emission problem of traditional LCD display technology, so it is more eye-friendly.

However, the bistable display technology still has the following shortcomings:
1) When electronic ink screens need to display specific images, it needs to design complex circuits;
2) LCD handwriting boards/LCD blackboards can only achieve a full-screen erasure, but cannot achieve selective erasure; if the selective erasure needs to be implemented, it needs to design complex circuit structures, resulting in high cost.

At present, no effective solutions have been proposed for the problems existing in related technologies, such as the need to design complex circuits to display specific images on electronic ink screens, and the inability of LCD handwriting boards/LCD blackboards to achieve selective erasure at low cost.

SUMMARY

In view of the defects of the prior art, the present application provides a light regulation and control screen and a preparation method thereof, a light regulation and control system, and a light regulation and control method, so as to solve at least one of the following problems: the need to design complex circuits to display specific images on electronic ink screens, and the inability of LCD handwriting boards/LCD blackboards to achieve selective erasure at low cost.

A first aspect of the present invention provides a light regulation and control screen including:
a first conductive structure;
a second conductive structure, arranged opposite to the first conductive structure;
a light response structure, disposed between the first conductive structure and the second conductive structure, which is used to be in a non-conductive state in the absence of light irradiation and to be in a conductive state in the case of light irradiation, and the wavelength of light is 200 nm~2,000 nm; and,
a bistable display structure, disposed between the first conductive structure and the second conductive structure and located on one side of or inside the light response structure, which is used to be in a selective erasing state under the action of voltage regulation and conductive state of the light response structure.

In some preferred embodiments, the first conductive structure includes:
a first base layer; and,
a first conductive layer, provided on the side of the first base layer close to the second conductive structure.

In some preferred embodiments, the second conductive structure includes:
a second base layer; and,
a second conductive layer, provided on the side of the second base layer close to the first conductive structure.

In some preferred embodiments, the light response structure includes:
a first light response layer, disposed between the first conductive structure and the bistable display structure.

In some preferred embodiments, the light response structure includes:
a second light response layer, disposed between the second conductive structure and the bistable display structure.

In some preferred embodiments, the bistable display structure includes:
a liquid crystal display layer, disposed between the first conductive structure and the second conductive structure and located on one side of the light response structure or inside the light response structure, which is used to be in a selective erasing state under the action of voltage regulation and conductive state of the light response structure.

In some preferred embodiments, the bistable display structure includes:
an ink display layer, disposed between the first conductive structure and the second conductive structure and located inside the light response structure, which is used to be in a selective erasing state under the action of voltage regulation and conductive state of the light response structure.

A second aspect of the present invention provides a method for preparing the light regulation and control screen described in the first aspect, comprising the steps of:
preparing the first conductive structure: a first conductive layer is formed on the surface of a first base layer so as to form the first conductive structure;
preparing the second conductive structure: ae second conductive layer is formed on the surface of a second base layer so as to form the second conductive structure;
preparing the light response structure: a first light response layer is formed on the surface of the first conductive structure; and,
preparing the light regulation and control screen: the first base layer, the first conductive layer, the first light response layer, a liquid crystal display layer, the second conductive layer and the second base layer are assembled to form the light regulation and control screen.

In some preferred embodiments, another method for preparing the light regulation and control screen described in the first aspect, comprising the steps of:
preparing the first conductive structure: a first conductive layer is formed on the surface of a first base layer so as to form the first conductive structure;
preparing the second conductive structure: a second conductive layer is formed on the surface of a second base layer so as to form the second conductive structure;
preparing the light response structure: a second light response layer is formed on the surface of the second conductive structure; and, preparing the light regulation and control screen: the first base layer, the first conductive layer, a liquid crystal display layer, the second light response layer, the second conductive layer and the second base layer are assembled to form the light regulation and control screen.

In some preferred embodiments, another method for preparing the light regulation and control screen described in the first aspect, comprising the steps of:

preparing the first conductive structure: a first conductive layer is formed on the surface of a first base layer so as to form the first conductive structure;

preparing the second conductive structure: a second conductive layer is formed on the surface of a second base layer so as to form the second conductive structure;

preparing the light response structure: a first light response layer is formed on the surface of the first conductive structure; and, a second light response layer is formed on the surface of the second conductive structure; and, preparing the light regulation and control screen: the first base layer, the first conductive layer, the first light response layer, a liquid crystal display layer, the second light response layer, the second conductive layer and the second base layer are assembled to form the light regulation and control screen.

In some preferred embodiments, another method for preparing the light regulation and control screen described in the first aspect, comprising the steps of:

preparing the first conductive structure: a first conductive layer is formed on the surface of a first base layer so as to form the first conductive structure;

preparing the second conductive structure: a second conductive layer is formed on the surface of a second base layer so as to form the second conductive structure;

preparing the light response structure: a first light response layer is formed on the surface of the first conductive structure; and, a second light response layer is formed on the surface of the second conductive structure; and, preparing the light regulation and control screen: the first base layer, the first conductive layer, the first light response layer, an ink display layer, the second light response layer, the second conductive layer and the second base layer are assembled to form the light regulation and control screen.

A third aspect of the present invention provides a light regulation and control system including:

a light regulation and control screen described in any one of the first aspect; or, a light regulation and control screen prepared by the method described in any one of the second aspect.

In some preferred embodiments, the light regulation and control system further includes:

a control device, connected to the light regulation and control screen and used to adjust the voltage applied to the light regulation and control screen.

In some preferred embodiments, the light regulation and control system further includes:

a light regulation and control device, used to emit light to the light regulation and control screen to change the state of the light response structure in the light regulation and control screen, in which the wavelength of the light is 200 nm~2,000 nm.

A fourth aspect of the present invention provides a light regulation and control method comprising the steps of:

obtaining a voltage regulation instruction;

adjusting the voltage applied to a first conductive structure and/or a second conductive structure according to the voltage regulation instruction, to make a bistable display structure to be in a selective erasing mode;

when the bistable display structure is in the selective erasing mode, determining whether a light response structure receives light irradiation, in which the wavelength of the light is 200 nm~2,000 nm;

when the light response structure receives light irradiation, the light response structure is in a conductive state, so that the bistable display structure illuminated by light is in a selective erasing state; and, when the light response structure does not receive light irradiation, the light response structure is in a non-conductive state, so that the bistable display structure is not in the selective erasing state.

In some preferred embodiments, the light regulation and control method further comprises the steps of:

obtaining a voltage regulation instruction; and, adjusting the voltage applied to the first conductive structure and/or the second conductive structure according to the voltage regulation instruction, to make the bistable display structure to be in a writing mode.

In some preferred embodiments, the light regulation and control method further comprises the steps of:

obtaining a voltage regulation instruction;

adjusting the voltage applied to the first conductive structure and/or the second conductive structure according to the voltage regulation instruction, to make the bistable display structure to be in a writing mode;

when the bistable display structure is in the writing mode, determining whether a light response structure receives light irradiation, in which the wavelength of the light is 200 nm~2,000 nm;

when the light response structure receives light irradiation, the light response structure is in a conductive state, so that the bistable display structure illuminated by light is in a writing state; and, when the light response structure does not receive light irradiation, the light response structure is in a non-conductive state, so that the bistable display structure is not in the writing state.

In some preferred embodiments, the light regulation and control method further comprises the steps of:

obtaining a voltage regulation instruction; and, adjusting the voltage applied to the first conductive structure and/or the second conductive structure according to the voltage regulation instruction, to make the bistable display structure to be in a global erasing mode.

In some preferred embodiments, the light regulation and control method further comprises the steps of:

when the light response structure receives light irradiation, detecting the irradiation range of the light;

according to the irradiation range, the light response structure is divided into a conductive area and a non-conductive area; and, according to the conductive area and the non-conductive area, the bistable display structure is divided into an erasable area and a non-erasable area.

In some preferred embodiments, the light regulation and control method further comprises the steps of:

when the light response structure receives light irradiation, detecting the irradiation range of the light;

according to the irradiation range, the light response structure is divided into a conductive area and a non-conductive area;

according to the conductive area and the non-conductive area, the bistable display structure is divided into an writing area and a non-writing area.

The present invention has the following advantages over the prior art:

1) low system power consumption: in the writing mode, the light regulation and control screen basically has no power consumption and only relies on the properties of the bistable material display layer for color rendering; in the erasing mode, most circuits is non-conductive due to the insulation of the light response structure in the case of the selective erasing state, and only a few high-voltage pulses are used in the case of the global erasing state, so the power consumption is not high;
2) fast response rate: the physical properties of the bistable material and the electrical properties of the light response structure are used for color rendering and erasing, and it does not need additional regional signal treatment process, so the response rate is extremely fast;
3) super resolution: compared with pixel display, the light regulation and control screen has extremely high resolution and it can be selective erased; during selective erasing, except for the area illuminated by light, other areas of the light response structure are still insulated, it is only conductive in the area illuminated by light, and can achieve selective erasure of handwriting in the conductive area;
4) low cost: compared with traditional methods, the present invention does not need complex circuit designs and additional sensing structures, which is more convenient for manufacturing large-size screens (such as electronic blackboards) and promoting wide applications.

BRIEF DESCRIPTION OF THE DRAWINGS

The accompanying drawings described here are provided for further understanding of the present disclosure, and constitute a part of the present disclosure. The exemplary embodiments of the present disclosure and illustrations thereof are intended to explain the present disclosure, but do not constitute inappropriate limitations to the present disclosure. In the drawings.

REFERENCE NUMERALS

100—light regulation and control screen; 110—first conductive structure; 111—first base layer; 112—first conductive layer; 120—second conductive structure; 121—second base layer; 122—second conductive layer; 130—light response structure; 131—first light response layer; 132—second light response layer; 140—bistable display structure; 141—liquid crystal display layer; 142—ink display layer; 200—control device; 300—light regulation and control device.

DETAILED DESCRIPTION

To make the objectives, technical solutions, and advantages of the present disclosure clearer, the present disclosure is described below with reference to the accompanying drawings and embodiments. It should be understood that the embodiments described herein are merely used to explain the present disclosure, rather than to limit the present disclosure. All other embodiments obtained by those of ordinary skill in the art based on the embodiments of the present disclosure without creative efforts should fall within the protection scope of the present disclosure.

Apparently, the accompanying drawings in the following description show merely some embodiments of the present disclosure, and a person of ordinary skill in the art may apply the present disclosure to other similar scenarios according to these drawings without creative efforts. In addition, it can also be appreciated that, although it may take enduring and complex efforts to achieve such a development process, for those of ordinary skill in the art related to the present disclosure, some changes such as design, manufacturing or production made based on the technical content in the present disclosure are merely regular technical means, and should not be construed as insufficiency of the present disclosure.

The "embodiment" mentioned in the present disclosure means that a specific feature, structure, or characteristic described in combination with the embodiment may be included in at least one embodiment of the present disclosure. The phrase appearing in different parts of the specification does not necessarily refer to the same embodiment or an independent or alternative embodiment exclusive of other embodiments. It may be explicitly or implicitly appreciated by those of ordinary skill in the art that the embodiment described herein may be combined with other embodiments as long as no conflict occurs.

Unless otherwise defined, the technical or scientific terms used in the present disclosure are as they are usually understood by those of ordinary skill in the art to which the present disclosure pertains. The terms "one", "a", "the" and similar words are not meant to be limiting, and may represent a singular form or a plural form. The terms "comprise", "include", "contain", "have" and any other variants in the present disclosure mean to cover the non-exclusive inclusion, for example, a process, method, system, product, or device that includes a series of steps or modules (units) is not necessarily limited to those steps or units which are clearly listed, but may include other steps or units which are not expressly listed or inherent to such a process, method, system, product, or device. The term "and/or" describes associations between associated objects, and it indicates three types of relationships. For example, "A and/or B" may indicate that A exists alone, A and B coexist, or B exists alone. The character "/" generally indicates that the associated objects are in an "or" relationship. The terms "first", "second", "third" and so on in the present disclosure are intended to distinguish between similar objects but do not necessarily indicate a specific order of the objects.

Embodiment 1

Figure 1:
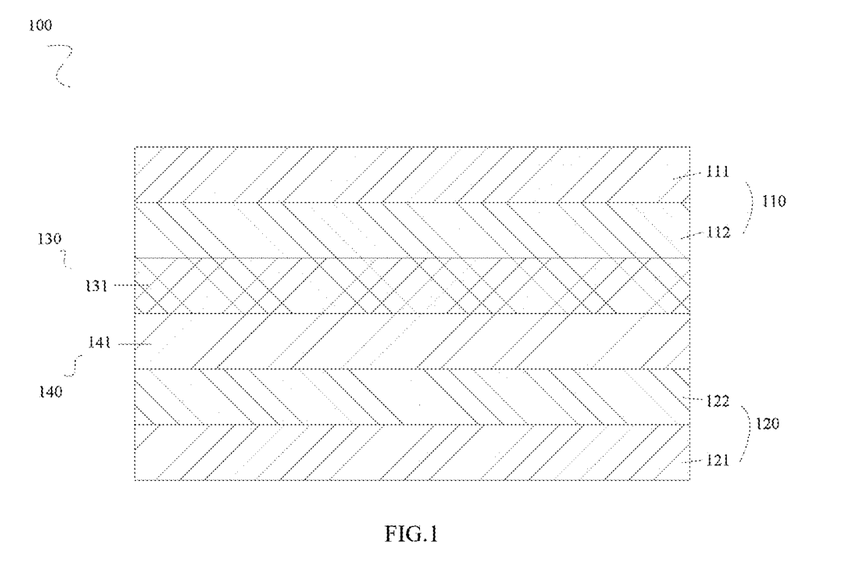
FIG. 1 is a section diagram (I) of a light regulation and control screen according to one embodiment of the present invention.
Figure 2:
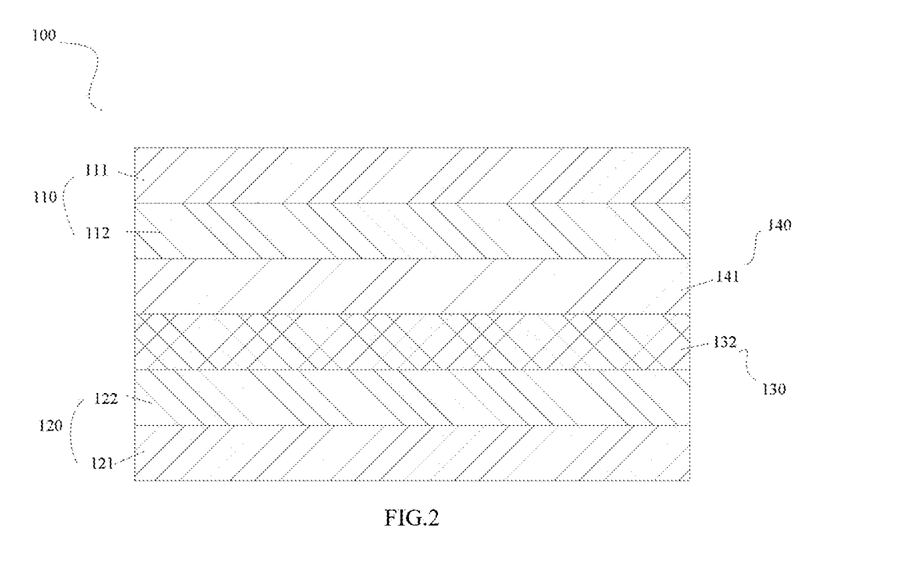
FIG. 2 is a section diagram (II) of a light regulation and control screen according to one embodiment of the present invention.
Figure 3:
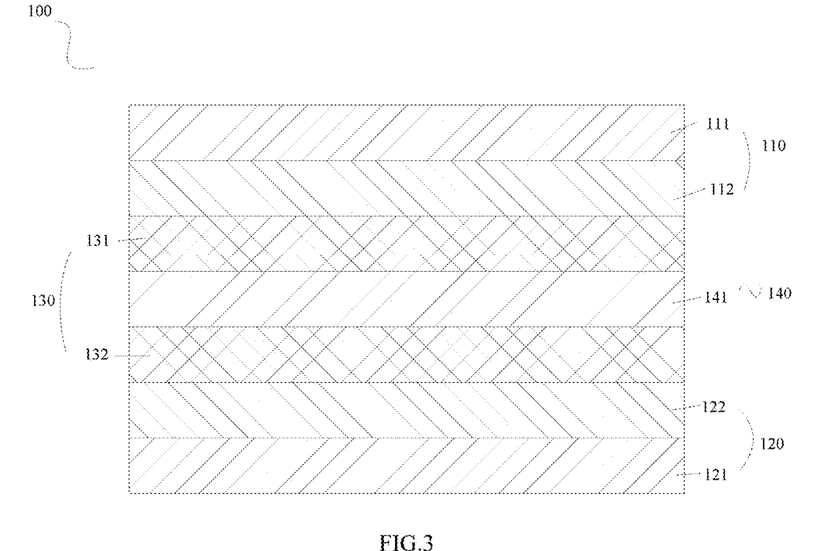
FIG. 3 is a section diagram (III) of a light regulation and control screen according to one embodiment of the present invention.

This embodiment relates to a light regulation and control screen and preparation method thereof. This embodiment is an illustrative example of the present invention. As shown in FIG. 1~FIG. 3, a light regulation and control screen 100 includes a first conductive structure 110, a second conductive structure 120, a light response structure 130 and a bistable display structure 140. The second conductive structure 120 is arranged opposite to the first conductive structure 110. The light response structure 130 is disposed between the first conductive structure 110 and the second conductive structure 120, which is used to be in a non-conductive state in the absence of light irradiation and to be in a conductive state in the case of light irradiation. The bistable display structure 140 is disposed between the first conductive structure 110 and the second conductive structure 120, and is located on one side of or inside the light response structure 130, which is used to be in a selective erasing state under the action of voltage regulation and conductive state of the light response structure 130.

The wavelength of light is 200 nm~2,000 nm. That is, light includes ultraviolet light, visible light and infrared light.

The working principle of the light regulation and control screen 100 is as follows:
the light regulation and control screen 100 includes a writing mode, a selective erasing model and a global erasing model;
when the light regulation and control screen 100 is in the selective erasing state, there are two cases as following:
in the case of absence of light irradiation, the light response structure 130 is in the non-conducting state. The electric field strength of the bistable display structure 140 is limited regardless of whether a voltage is applied to the bistable display structure 140 and whether the direction of the voltage applied to the bistable display structure 140 is adjusted; and,
in the case of light irradiation, the light response structure 130 is in the conductive state. The electric field strength of the bistable display structure 140 is enhanced, and the operation of the bistable display structure 140 can be realized.

In this embodiment, the size of the light regulation and control screen 100 is not limited. Specifically, the size of the light regulation and control screen 100 can be 5~200 inches, including but not limited to 5.4 inches, 7.9 inches, 8.3 inches, 9.7 inches, 10.2 inches, 10.5 inches, 10.9 inches, 11 inches, 12.9 inches, 14 inches, 16 inches, 21.5 inches, 24 inches, 27 inches, 32 inches, 43 inches, 48 inches, 50 inches, 55 inches, 65 inches, 75 inches, 85 inches, 100 inches, 148 inches, and 168 inches.

In this embodiment, the light regulation and control screen 100 can be used in writing boards, display screens and electronic blackboards.

In this embodiment, there are three implementation modes as follows:
1) as shown in FIG. 1, the bistable display structure 140 is disposed between the second conductive structure 120 and the light response structure 130;
2) as shown in FIG. 2, the bistable display structure 140 is provided between the first conductive structure 110 and the light response structure 130; and,
3) as shown in FIG. 3, the bistable display structure 140 is disposed inside the light response structure 130.

As shown in FIG. 1~FIG. 3, the first conductive structure 110 includes a first base layer 111 and a first conductive layer 112. The first conductive layer 112 is provided on the side of the first base layer 111 close to the second conductive structure 120.

The first base layer 111 is made of light-transmitting materials, including but not limited to flexible materials, non-flexible materials, such as glass, plastic film, PET, etc.

In some preferred examples, the first base layer 111 is made of a light-colored material or a dark-colored material.

When the first base layer 111 is made of a light-colored material, the light transmittance of the first base layer 111 is 15%~90%.

Preferably, the light transmittance of the first base layer 111 is 30%~90%. More preferably, the light transmittance of the first base layer 111 is 50%~90%. Most preferably, the light transmittance of the first base layer 111 is 75%~90%.

When the first base layer 111 is made of a dark-colored material, the light transmittance of the first base layer 111 is 0%~80%.

Preferably, the light transmittance of the first base layer 111 is 0%~60%. More preferably, the light transmittance of the first base layer 111 is 0%~50%. Most preferably, the light transmittance of the first base layer 111 is 0%~35%.

The thickness of the first base layer 111 is not limited and can be defined according to the requirement of the light regulation and control screen 100.

In some preferred examples, the thickness of the first base layer 111 is 100 μm~1 cm.

The size of the first conductive layer 112 matches the size of the first base layer 111. Generally, the length of the first conductive layer 112 is equal to the length of the first base layer 111, and the width of the first conductive layer 112 is equal to the width of the first base layer 111.

The first conductive layer 112 is made of conductive materials, including but not limited to indium tin oxide (ITO), TCO conductive glass (FTO), polyethylene dioxythiophene (PEDOT), etc. In some preferred examples, the thickness of the first conductive layer 112 is 2 nm~100 μm.

As shown in FIG. 1~FIG. 3, the second conductive structure 120 includes a second base layer 121 and a second conductive layer 122. The second conductive layer 122 is provided on the side of the second base layer 121 close to the first conductive structure 110.

Specifically, the second conductive layer 122 is disposed on the side of the second base layer 121 close to the first conductive layer 112.

The preparation materials of the second base layer 121 include but are not limited to flexible materials, non-flexible materials, such as glass, plastic film, PET, etc.

In some preferred examples, the second base layer 121 is made of a light-colored material or a dark-colored material.

When the second base layer 121 is made of a light-colored material, the light transmittance of the second base layer 121 is 15%~90%.

Preferably, the light transmittance of the second base layer 121 is 30%~90%. More preferably, the light transmittance of the second base layer 121 is 50%~90%. Most preferably, the light transmittance of the second base layer 121 is 75%~90%.

When the second base layer 121 is made of a dark-colored material, the light transmittance of the second base layer 121 is 0%~80%.

Preferably, the light transmittance of the second base layer 121 is 0%~60%. More preferably, the light transmittance of the second base layer 121 is 0%~50%. Most preferably, the light transmittance of the second base layer 121 is 0%~35%.

For the first base layer 111 and the second base layer 121, at least one of the first base layer 111 and the second base layer 121 is made of a light-colored material.

The size of the second base layer 121 matches the size of the first base layer 111. Generally, the length of the second base layer 121 is equal to the length of the first base layer 111, and the width of the second base layer 121 is equal to the width of the first base layer 111.

The thickness of the second base layer 121 is not limited and can be defined according to the requirement of the light regulation and control screen 100.

In some preferred examples, the thickness of the second base layer 121 is 100 μm~1 cm.

The size of the second conductive layer 122 matches the size of the second base layer 121. Generally, the length of the second conductive layer 122 is equal to the length of the second base layer 121, and the width of the second conductive layer 122 is equal to the width of the second base layer 121.

The second conductive layer 122 is made of transparent conductive materials, including but not limited to indium tin oxide (ITO), TCO conductive glass (FTO), polyethylene dioxythiophene (PEDOT), etc.

In some preferred examples, the thickness of the second conductive layer 122 is 2 nm~100 μm. As shown in FIG. 1, the light response structure 130 includes a first light response layer 131. The first light response layer 131 is disposed between the first conductive structure 110 and the bistable display structure 140.

Specifically, the first light response layer 131 is disposed between the first conductive layer 112 and the bistable display structure 140.

The size of the first light response layer 131 matches the size of the first conductive layer 112. Generally, the length of the first light response layer 131 is equal to the length of the first conductive layer 112, and the width of the first light response layer 131 is equal to the width of the first conductive layer 112.

The first light response layer 131 is made of photosensitive materials, or materials that forms a rectifying structure with the first conductive layer 112, such as a PN junction or a Schottky junction. For example, the materials can be titanium dioxide, gallium nitride, zinc oxide, perovskite materials, mercury cadmium telluride, etc.

The thickness of the first light response layer 131 is not limited and can be defined according to the requirement of the light regulation and control screen 100.

In some preferred examples, the thickness of the first light response layer 131 is 2 nm~100 μm.

As shown in FIG. 2, the light response structure 130 comprises a second light response layer 132. The second light response layer 132 is disposed between the second conductive structure 120 and the bistable display structure 140.

Specifically, the second light response layer 132 is disposed between the second conductive layer 122 and the bistable display structure 140.

The size of the second light response layer 132 matches the size of the second conductive layer 122. Generally, the length of the second light response layer 132 is equal to the length of the second conductive layer 122, and the width of the second light response layer 132 is equal to the width of the second conductive layer 122.

The second light response layer 132 is made of photosensitive materials, or materials that forms a rectifying structure with the second conductive layer 122, such as a PN junction or a Schottky junction. For example, the materials can be titanium dioxide, gallium nitride, zinc oxide, perovskite materials, mercury cadmium telluride, etc.

The thickness of the second light response layer 132 is not limited and can be defined according to the requirement of the light regulation and control screen 100.

In some preferred examples, the thickness of the second light response layer 132 is 2 nm~100 μm. As shown in FIG. 1~FIG. 2, the bistable display structure 140 includes a liquid crystal display layer 141. The liquid crystal display layer 141 is disposed between the first conductive structure 110 and the second conductive structure 120, and is located on one side of the light response structure 130 or inside the light response structure 130, which is used to be in a selective erasing state under the action of voltage regulation and conductive state of the light response structure 130.

Specifically, the liquid crystal display layer 141 is disposed between the first conductive layer 112 and the second conductive layer 122, and is located on one side of the first light response layer 131 and/or on one side of the second light response layer 132.

In this embodiment, there are several implementation modes as follows:

1) as shown in FIG. 1, the liquid crystal display layer 141 is disposed between the second conductive layer 122 and the first light response layer 131;
2) as shown in FIG. 2, the liquid crystal display layer 141 is disposed between the first conductive layer 112 and the second light response layer 132; and,
3) as shown in FIG. 3, the liquid crystal display layer 141 is disposed between the first light response layer 131 and the second light response layer 132.

The size of the liquid crystal display layer 141 matches the size of the first light response layer 131 and/or the second light response layer 132. Generally, the length of the liquid crystal display layer 141 is no longer than the length of the first light response layer 131 and/or the second light response layer 132, and the width of the liquid crystal display layer 141 is no longer than the width of the first light response layer 131 and/or the second light response layer 132.

The liquid crystal display layer 141 is made of liquid crystal materials, such as cholesteric liquid crystal materials.

The thickness of the liquid crystal display layer 141 is not limited and can be defined according to the requirement of the light regulation and control screen 100.

In some preferred examples, the thickness of the liquid crystal display layer 141 is 10 nm~100 μm. For the light regulation and control screen 100 as shown in FIG. 1, its preparation method is as follows:

preparing the first conductive structure 110: the first conductive layer 112 is formed on the surface of the first base layer 111 so as to form the first conductive structure 110;

preparing the second conductive structure 120: the second conductive layer 122 is formed on the surface of the second base layer 121 so as to form the second conductive structure 120;

preparing the light response structure 130: the first light response layer 131 is formed on the surface of the first conductive structure 112; and, preparing the light regulation and control screen 100: the first base layer 111, the first conductive layer 112, the first light response layer 131, the liquid crystal display layer 141, the second conductive layer 122 and the second base layer 121 are assembled to form the light regulation and control screen 100.

Further, before the step of preparing the light regulation and control screen 100, it comprises a step of:

preparing the bistable display structure 140: the liquid crystal display layer 141 is formed on the surface of the second conductive layer 122.

For the light regulation and control screen 100 as shown in FIG. 2, its preparation method is as follows:

preparing the first conductive structure 110: the first conductive layer 112 is formed on the surface of the first base layer 111 so as to form the first conductive structure 110;

preparing the second conductive structure 120: the second conductive layer 122 is formed on the surface of the second base layer 121 so as to form the second conductive structure 120;

preparing the light response structure 130: the second light response layer 132 is formed on the surface of the second conductive structure 122; and, preparing the light regulation and control screen 100: the first base layer 111, the first conductive layer 112, the liquid crystal display layer 141, the second light response layer 132, the second conductive layer 122 and the second base layer 121 are assembled to form the light regulation and control screen 100.

Further, before the step of preparing the light regulation and control screen 100, it comprises a step of:

preparing the bistable display structure 140: the liquid crystal display layer 141 is formed on the surface of the first conductive layer 112.

For the light regulation and control screen 100 as shown in FIG. 3, its preparation method is as follows:

preparing the first conductive structure 110: the first conductive layer 112 is formed on the surface of the first base layer 111 so as to form the first conductive structure 110;

preparing the second conductive structure 120: the second conductive layer 122 is formed on the surface of the second base layer 121 so as to form the second conductive structure 120;

preparing the light response structure 130: the first light response layer 131 is formed on the surface of the first conductive structure 112, and the second light response layer 132 is formed on the surface of the second conductive structure 122;

preparing the light regulation and control screen 100: the first base layer 111, the first conductive layer 112, the first light response layer 131, the liquid crystal display layer 141, the second light response layer 132, the second conductive layer 122 and the second base layer 121 are assembled to form the light regulation and control screen 100.

Further, before the step of preparing the light regulation and control screen 100, it comprises a step of:

preparing the bistable display structure 140: the liquid crystal display layer 141 is formed on the surface of the first light response layer 131 or the second light response layer 132.

In the step of preparing the first conductive structure 110, the first conductive layer 112 is formed on the surface of the first base layer 111 by any one or more combinations of methods, such as magnetron sputtering, ion plating, electron beam evaporation, thermal evaporation, electrochemical deposition, coating and printing.

In some preferred examples, a 125 μm PET film is used as the first base layer 111. In an inert gas (argon) atmosphere, a layer of 200 nm ITO is sputtered on the surface of the first base layer 111 to form the first conductive layer 112 by using magnetron sputtering technology.

In the step of preparing the second conductive structure 120, the second conductive layer 122 is formed on the surface of the second base layer 121 by any one or more combinations of methods, such as magnetron sputtering, ion plating, electron beam evaporation, thermal evaporation, electrochemical deposition, coating and printing.

In some preferred examples, a 125 μm PET film is used as the second base layer 121. In an inert gas (argon) atmosphere, a layer of 200 nm ITO is sputtered to form the second conductive layer 122 by using magnetron sputtering technology.

In the step of preparing the light response structure 130, the first light response layer 131 is formed on the surface of the first conductive layer 112 by any one or more combinations of methods, such as magnetron sputtering, ion plating, electron beam evaporation, thermal evaporation, electrochemical deposition, coating and printing. Or, the second light response layer 132 is formed on the surface of the second conductive layer 122 by any one or more combinations of methods, such as magnetron sputtering, ion plating, electron beam evaporation, thermal evaporation, electrochemical deposition, coating and printing.

In some preferred examples, in a mixed atmosphere of oxygen and argon (4:71), a layer of 100 nm zinc oxide is sputtered on the surface of the first conductive layer 112 to form the first light response layer 131 by using magnetron sputtering technology. Or, a layer of 100 nm zinc oxide is sputtered on the surface of the second conductive layer 122 to form the second light response layer 132 by using magnetron sputtering technology.

In the step of preparing the light regulation and control screen 100, the assembling method includes but is not limited to roll-to-roll assembly.

In the step of preparing the bistable display structure 140, the liquid crystal slurry is evenly distributed between the first light response layer 131 and the second conductive layer 122, or between the first conductive layer 112 and the second light response layer 132, by extrusion coating or pouring or other common methods, then the liquid crystal slurry is cured (such as by ultraviolet irradiation curing) and edge sealed (such as by edge sealing with ultraviolet curing glue or other adhesives).

In some preferred examples, the liquid crystal slurry includes liquid crystal (such as cholesteric liquid crystal), spacers, prepolymers, and photoinitiators.

In some preferred examples, the preparation method of the liquid crystal slurry is as follows: stirring and mixing liquid crystal (such as cholesteric liquid crystal), prepolymer, and photoinitiator at a mass ratio of 70:28:2 at 40° C. for 5 hours to obtain a mixed slurry; and, mixing 500 nm spacers with the mixed slurry at 0.4% mass ratio to obtain the liquid crystal slurry. The method of using the light regulation and control screen 100 is as follows:

1) Writing mode;

There is no need to apply voltage to the first conductive layer 112 and the second conductive layer 122, and the physical squeeze can be sensed by relying on the bistable effect of the liquid crystal display layer 141, thereby realizing the display of handwriting.

2) Erasing mode;

A voltage is applied to the first conductive layer 112 and the second conductive layer 122 so that the liquid crystal display layer 141 is used to be in the erasing mode;

In the case of absence of light irradiation on the first light response layer 131 and/or the second light response layer 132, the first light response layer 131 and/or the second light response layer 132 is in a non-conductive state. The electric field intensity of the liquid crystal display layer 141 is limited by the first light response layer 131 and/or the second light response layer 132. Although the liquid crystal display layer 141 is in the erase mode, the liquid crystal display layer 141 is not in an erasing state; and, In the case of light irradiation on the first light response layer 131 and/or the second light response layer 132, the first light response layer 131 and/or the second light response layer 132 is in a conductive state. The electric field intensity of the liquid crystal display layer 141 is not limited by the first light response layer 131 and/or the second light response layer 132. Under the action of the first conductive layer 112 and the second conductive layer 122, the electric field intensity of the liquid crystal display layer 141 is enhanced, and the liquid crystal display layer 141 is used to be in the erased state, thereby achieving a selective erasing (applying continuous low voltage or low voltage pulses to the first conductive layer 112 and the second conductive layer 122) or a global erasing (applying high voltage pulses to the first conductive layer 112 and the second conductive layer 122).

The technical effects of this embodiment are as follows:
1) low system power consumption: in the writing mode, the light regulation and control screen basically has no power consumption and only relies on the properties of the liquid crystal display layer for physical extrusion sensing and color rendering; in the erasing mode, most circuits is non-conductive due to the insulation of the light response structure in the case of the selective erasing state, and only a few high voltage pulses are used in the case of the global erasing state, so the power consumption is not high;
2) fast response rate: the physical properties of the liquid crystal display layer (cholesteric liquid crystal material) and the electrical properties of the light response structure are used for color rendering and erasing, and it does not need additional regional signal treatment process, so the response rate is extremely fast;
3) super resolution: compared with pixel display, the light regulation and control screen has extremely high resolution;
4) selective erasing: during selective erasing, except for the area illuminated by light, other areas of the light response structure are still insulated, it is only conductive in the area illuminated by light, and can achieve selective erasure of handwriting in the conductive area; and,
5) low cost: compared with traditional methods, this embodiment does not need complex circuit designs and additional sensing structures, which is more convenient for manufacturing large-size screens (such as electronic blackboards) and promoting applications.

Embodiment 2

Figure 4:
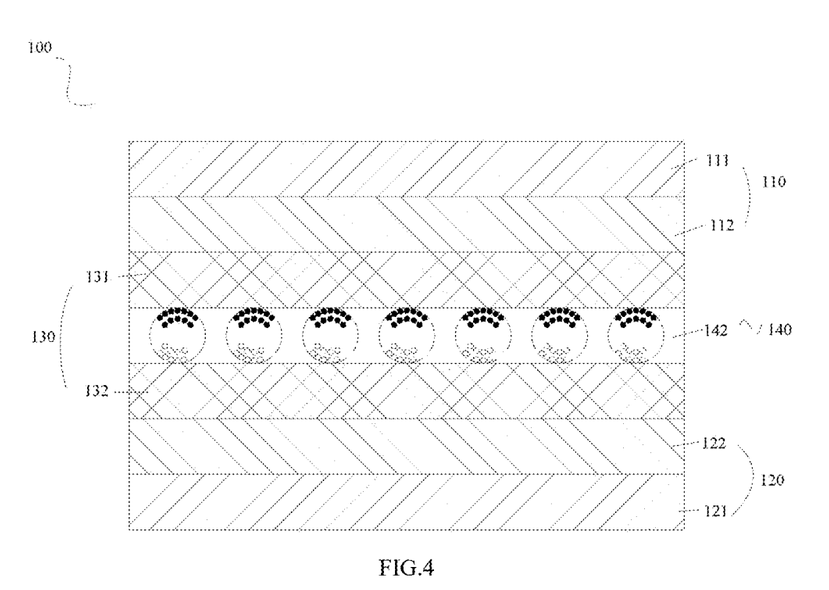
FIG. 4 is a section diagram (IV) of a light regulation and control screen according to one embodiment of the present invention.

This embodiment relates to a light regulation and control screen and preparation method thereof. This embodiment is an illustrative example of the present invention. As shown in FIG. 4, a light regulation and control screen 100 includes a first conductive structure 110, a second conductive structure 120, a light response structure 130 and a bistable display structure 140. The second conductive structure 120 is arranged opposite to the first conductive structure 110. The light response structure 130 is disposed between the first conductive structure 110 and the second conductive structure 120, which is used to be in a non-conductive state in the absence of light irradiation and to be in a conductive state in the case of light irradiation. The bistable display structure 140 is disposed between the first conductive structure 110 and the second conductive structure 120, and is located inside the light response structure 130.

In this embodiment, the structures and materials of the first conductive structure 110 and the second conductive structure 120 are basically the same as those in embodiment 1, and will not be repeated here.

As shown in FIG. 4, the light response structure 130 includes a first light response layer 131 and a second light response layer 132. The first light response layer 131 is disposed between the first conductive structure 110 and the bistable display structure 140. The second light response layer 132 is disposed between the second conductive structure 120 and the bistable display structure 140. Specifically, the first light response layer 131 is disposed between the first conductive layer 112 and the bistable display structure 140, and the second light response layer 132 is disposed between the second conductive layer 122 and the bistable display structure 140.

In this embodiment, the structures and materials of the first light response layer 131 and the second light response layer 132 are basically the same as those in Embodiment 1, and will not be repeated here.

As shown in FIG. 4, the bistable display structure 140 includes an ink display layer 142. The ink display layer 142 is disposed between the first conductive structure 110 and the second conductive structure 120, and is located inside the light response structure 130, which is used to be in a selective erasing state under the action of voltage regulation and conductive state of the light response structure 130.

Specifically, the ink display layer 142 is disposed between the first light response layer 131 and the second light response layer 132.

The size of the ink display layer 142 matches the size of the first light response layer 131 and/or the second light response layer 132. Generally, the length of the ink display layer 142 is no longer than the length of the first light response layer 131 and/or the second light response layer 132, and the width of the ink display layer 142 is no longer than the width of the first light response layer 131 and/or the second light response layer 132.

As shown in FIG. 4, the ink display layer 142 consists of electronic ink capsules and a transparent adhesive, and the electronic ink capsules consist of stained positive and negative charges.

The thickness of the ink display layer 142 is not limited and can be defined according to the requirement of the light regulation and control screen 100.

In some preferred examples, the thickness of the ink display layer 142 is 10 nm~100 μm.

The preparation method of the light regulation and control screen 100 in this embodiment is as follows:
preparing the first conductive structure 110: the first conductive layer 112 is formed on the surface of the first base layer 111 so as to form the first conductive structure 110;
preparing the second conductive structure 120: the second conductive layer 122 is formed on the surface of the second base layer 121 so as to form the second conductive structure 120;
preparing the light response structure 130: the first light response layer 131 is formed on the surface of the first conductive structure 112; and, the second light response layer 132 is formed on the surface of the second conductive structure 122; and,
preparing the light regulation and control screen 100: the first base layer 111, the first conductive layer 112, the first light response layer 131, the ink display layer 142, the second light response layer 132, the second conductive layer 122 and the second base layer 121 are assembled to form the light regulation and control screen 100.

Further, before the step of preparing the light regulation and control screen 100, it comprises a step of:

preparing the bistable display structure 140: the ink display layer 142 is formed between the first light response layer 131 and the second light response layer 132.

The steps of preparing the first conductive structure 110, preparing the second conductive structure 120 and preparing the light response structure 130 are basically the same as those in Embodiment 1, and will not be repeated here.

In the step of preparing the bistable display structure 140, the preparation method is as follows: the electronic ink capsules are laid on the second conductive layer 122 to ensure contact between each electronic ink capsule and electrode. The first conductive structure 110 is covered above the electronic ink capsules, and a transparent adhesive is injected between the electronic ink capsules to reduce the distance between the electrodes and the electronic ink capsules.

In this embodiment, the method of using the light regulation and control screen 100 is as follows:

1) Writing mode;
A forward voltage is applied to the first conductive layer 112 and the second conductive layer 122 so that the ink display layer 142 is used to be in the writing mode;
In the case of absence of light irradiation on the first light response layer 131 and/or the second light response layer 132, the first light response layer 131 and/or the second light response layer 132 is in a non-conductive state. The electric field intensity of the ink display layer 142 is limited by the first light response layer 131 and/or the second light response layer 132. Although the ink display layer 142 is in the writing mode, the ink display layer 142 is not in a writing state; and,
In the case of light irradiation on the first light response layer 131 and/or the second light response layer 132, the first light response layer 131 and/or the second light response layer 132 is in a conductive state. The electric field intensity of the ink display layer 142 is not limited by the first light response layer 131 and/or the second light response layer 132. Under the action of the first conductive layer 112 and the second conductive layer 122, the electric field intensity of the ink display layer 142 is enhanced, and the ink display layer 142 is in the writing state, thereby achieving writing.

2) Selective erasing mode;
A reverse voltage (continuous low voltage or low voltage pulses) is applied to the first conductive layer 112 and the second conductive layer 122 so that the ink display layer 142 is used to be in the selective erasing mode;
In the case of absence of light irradiation on the first light response layer 131 and/or the second light response layer 132, the first light response layer 131 and/or the second light response layer 132 is in a non-conductive state. The electric field intensity of the ink display layer 142 is limited by the first light response layer 131 and/or the second light response layer 132. Although the ink display layer 142 is in the erasing mode, the ink display layer 142 is not in an erasing state; and,
In the case of light irradiation on the first light response layer 131 and/or the second light response layer 132, the first light response layer 131 and/or the second light response layer 132 is in a conductive state. The electric field intensity of the ink display layer 142 is not limited by the first light response layer 131 and/or the second light response layer 132. Under the action of the first conductive layer 112 and the second conductive layer 122, the electric field intensity of the ink display layer 142 is enhanced, and the ink display layer 142 is in the erasing state, thereby achieving the selective erasing.

3) Global erasing mode;
A reverse voltage (high voltage pulses) is applied to the first conductive layer 112 and the second conductive layer 122 so that the ink display layer 142 is used to be in the global erasing mode. The technical effects of this embodiment are as follows:

1) low system power consumption: in the writing and erasing modes, most circuits is non-conductive due to the insulation of the light response structure, so the power consumption is low;
2) fast response rate: the electrical properties of the ink display layer and the light response structure are used for color rendering and erasing, and it does not need additional regional signal treatment process, so the response rate is extremely fast;
3) super resolution: compared with pixel display, the light regulation and control screen has extremely high resolution;
4) selective erasing: during selective erasing, except for the area illuminated by light, other areas of the light response structure are still insulated, it is only conductive in the area illuminated by light, and can achieve selective erasure of handwriting in the conductive area;
5) selective writing: during selective writing, except for the area illuminated by light, other areas of the light response structure are still insulated, it is only conductive in the area illuminated by light, and can achieve selective writing of handwriting in the conductive area without many electrodes; and,
6) low cost: compared with traditional methods, this embodiment does not need complex circuit designs and additional sensing structures, which is more convenient for manufacturing large-size screens (such as electronic blackboards) and promoting wide applications.

Embodiment 3

This embodiment relates to a light regulation and control system.

Figure 5:
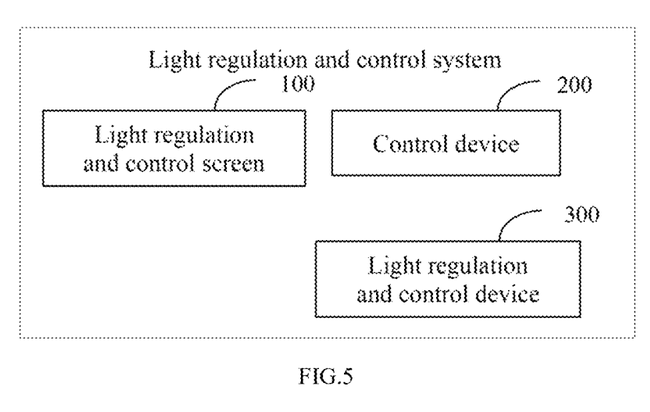
FIG. 5 is a frame diagram of a light regulation and control screen according to one embodiment of the present invention.

This embodiment is an illustrative example of the present invention. As shown in FIG. 5, the light regulation and control system includes the light regulation and control screen 100 described in Embodiment 1 or Embodiment 2.

Further, the light regulation and control system also includes a control device 200. The control device 200 is connected to the light regulation and control screen 100, and is used to adjust the voltage applied to the light regulation and control screen 100.

Specifically, the control device 200 is connected to at least one of the first conductive structure 110 and the second conductive structure 120 for adjusting the voltage applied to the first conductive structure 110 and the second conductive structure 120.

More specifically, the control device 200 is connected to at least one of the first conductive layer 112 and the second conductive layer 122 for adjusting the voltage applied to the first conductive layer 112 and the second conductive layer 122.

The control device 200 has the following working modes:
1) The light regulation and control screen 100 is directly controlled by the control device 200 so that the light control screen 100 is used to be in a writing mode or an erasing mode, for example, controlled by key switching;
2) The control device 200 obtains control signals from the outside to make the light control screen 100 to be in a writing mode or an erasing mode, for example, obtaining control signals via wireless connection.

The control device 200 at least includes a control circuit, a power module and a driving module. The power module is connected to the control circuit, and the driving module is connected to the control circuit, the first conductive layer 112 and the second conductive layer 122 respectively. In some preferred examples, the control circuit includes but is not limited to a microcontroller and a low-power circuit.

In some preferred examples, the driving module includes but is not limited to logic gate circuits, chips, etc., such as STC and STM.

Further, the control device 200 also includes a communication module. The communication module is connected with the control circuit and is used to communicate with the outside.

In some preferred examples, the communication module includes but is not limited to Bluetooth sensors, antennas, etc., such as SKYLAB Bluetooth module and 2.4G wireless module.

Further, the light regulation and control system also includes a light regulation and control device 300. The light regulation and control device 300 emits light to the light regulation and control screen 100 to change the state of the light response structure 130 in the light regulation and control screen 100.

The wavelength of the light is 200 nm~2,000 nm.

In some preferred examples, the light control device 300 is also communicatively connected with the control device 200 for sending a control signal to the control device 200, so that the working mode of the light regulation and control screen 100 can be switched by the control device 200.

The light regulation and control device 300 at least includes a light emitting module. The light emitting module emits light to the light regulation and control screen 100 to change the state of the light response structure 130.

Specifically, the light emitting module emits light to the first light response layer 131 and/or the second light response layer 132, so that the area of the first light response layer 131 and/or the second light response layer 132 illuminated by the light is used to be in a conductive state.

The technical effects of this embodiment are as follows:
1) fast response rate: the electrical property of the light response structure is used for color rendering and erasing, and it does not need additional regional signal treatment process, so the response rate is extremely fast;
2) selective erasing: during selective erasing, the light regulation and control device is used to emit light to the light regulation and control screen; except for the area illuminated by light, other areas of the light response structure are still insulated, it is only conductive in the area illuminated by light, and can achieve selective erasure of handwriting in the conductive area;
3) low cost: compared with traditional methods, this embodiment does not need complex circuit designs and additional sensing structures, which is more convenient for promoting wide applications.

Embodiment 4

This embodiment relates to a light regulation and control method.

This embodiment is an illustrative example of the present invention. The light regulation and control method comprises the steps of:
Step S602: obtaining a voltage regulation instruction;
Step S604: adjusting the voltage applied to a first conductive structure and/or a second conductive structure according to the voltage regulation instruction, to make a bistable display structure to be in a selective erasing mode;
Step S606: when the bistable display structure is in the selective erasing mode, determining whether a light response structure receives light irradiation;
Step S608: when the light response structure receives light irradiation, the light response structure is in a conductive state, so that the bistable display structure illuminated by light is in a selective erasing state;
Step S610: when the light response structure does not receive light irradiation, the light response structure is in a non-conductive state, so that the bistable display structure is not in the selective erasing state.

Step S608 and Step S610 are parallel steps.

In Step S602, the voltage regulation instruction includes a first voltage regulation instruction, a second voltage regulation instruction and a third voltage regulation instruction. The first voltage regulation instruction is used to instruct the application of continuous low voltage or low voltage pulses to the first conductive structure and/or the second conductive structure, the second voltage regulation instruction is used to instruct the application of high voltage pulses to the first conductive structure and/or the second conductive structure, and the third voltage regulation instruction is used to instruct the application of a reverse voltage to the first conductive structure and/or the second conductive structure.

The first voltage regulation instruction and the second voltage regulation instruction are used for the light regulation and control screen 100 described in Embodiment 1. The third voltage regulation instruction is used for the light regulation and control screen 100 described in Embodiment 2.

In Step S604, there are several implementation modes:
1) After adjusting the voltage applied to the first conductive structure and/or the second conductive structure according to the first voltage regulation instruction, the bistable display structure (the liquid crystal display layer 141) is used to be in a selective erasing mode;
2) After adjusting the voltage applied to the first conductive structure and/or the second conductive structure according to the second voltage regulation instruction, the bistable display structure (the liquid crystal display layer 141) is used to be in a global erasing mode;
3) After adjusting the voltage applied to the first conductive structure and/or the second conductive structure according to the third voltage regulation instruction, the bistable display structure (the ink display layer 142) is used to be in a selective erasing mode.

Through the above steps, the selective erasing of the light regulation and control screen can be achieved by utilizing the selective conductive characteristics of the light response structure.

Further, the light regulation and control method also comprises the step s of:

Step S702: obtaining a voltage regulation instruction;

Step S704: adjusting the voltage applied to the first conductive structure and/or a second conductive structure according to the voltage regulation instruction, to make the bistable display structure to be in a writing mode;

Step S706: when the bistable display structure is in the writing mode, determining whether a light response structure receives light irradiation;

Step S708: when the light response structure receives light irradiation, the light response structure is in a conductive state, so that the bistable display structure illuminated by light is in a writing state;

Step S710: when the light response structure does not receive light irradiation, the light response structure is in a non-conductive state, so that the bistable display structure is not in the writing state.

Steps S702~S710 and steps S602~S610 are parallel steps.

Further, Step S602 and Step S702 can be the same step.

In Step S702, the voltage regulation instruction includes a fourth voltage regulation instruction. The fourth voltage regulation instruction is used to instruct the application of a forward voltage to the first conductive structure and/or the second conductive structure.

In this case, the bistable display structure is the ink display layer 142.

If the bistable display structure is the liquid crystal display layer 141, only Steps S702~S704 are performed.

Further, the light regulation and control method also comprises the steps of:

Step S802: when the light response structure receives light irradiation, detecting the irradiation range of the light;

Step S804: according to the irradiation range, the light response structure is divided into a conductive area and a non-conductive area;

Step S806: according to the conductive area and the non-conductive area, the bistable display structure is divided into an erasable area and a non-erasable area.

Further, the method also comprises the steps of:

Step S808: according to the conductive area and the non-conductive area, the bistable display structure is divided into a writing area and a non-writing area.

Steps S802~S808 are performed after Step 608 and Step S708.

For the light regulation and control screen 100 described in Embodiment 1, the light regulation and control method comprises the steps as follows:

Step S901: obtaining a voltage regulation instruction;

Step S902: when the voltage regulation instruction is the first voltage regulation instruction, adjusting the voltage applied to the first conductive structure and/or a second conductive structure, to make the bistable display structure to be in a selective erasing mode;

Step S903: when the voltage regulation instruction is the second voltage regulation instruction, adjusting the voltage applied to the first conductive structure and/or a second conductive structure, to make the bistable display structure to be in a global erasing mode;

Step S904: when the bistable display structure is in the selective erasing mode, determining whether a light response structure receives light irradiation;

Step S905: when the light response structure receives light irradiation, detecting the irradiation range of the light;

Step S906: according to the irradiation range, the light response structure is divided into a conductive area and a non-conductive area;

Step S907: according to the conductive area and the non-conductive area, the bistable display structure is divided into an erasable area and a non-erasable area.

For the light regulation and control screen 100 described in Embodiment 2, the light regulation and control method comprises the steps as follows:

Step S1001: obtaining a voltage regulation instruction;

Step S1002: when the voltage regulation instruction is the fourth voltage regulation instruction, adjusting the voltage applied to the first conductive structure and/or a second conductive structure, to make the bistable display structure to be in a writing mode;

Step S1003: when the voltage regulation instruction is the third voltage regulation instruction, adjusting the voltage applied to the first conductive structure and/or a second conductive structure, to make the bistable display structure to be in a selective erasing mode;

Step S1004: when the bistable display structure is in the writing mode or the selective erasing mode, determining whether a light response structure receives light irradiation;

Step S1005: when the light response structure receives light irradiation, detecting the irradiation range of the light;

Step S1006: according to the irradiation range, the light response structure is divided into a conductive area and a non-conductive area;

Step S1007: according to the conductive area and the non-conductive area, the bistable display structure is divided into an erasable area (a writing area) and a non-erasable area (a non-writing area).

The technical effects of the present invention are as follows:

selective erasing: during selective erasing, the light regulation and control device is used to emit light to the light regulation and control screen; except for the area illuminated by light, other areas of the light response structure are still insulated, it is only conductive in the area illuminated by light, and can achieve selective erasure of handwriting in the conductive area.

Embodiment 5

This embodiment relates to a specific implementation of the light regulation and control screen of the present invention.

A selective erasing light regulation and control screen includes a first conductive film, a second conductive film, an ultraviolet response layer and a cholesteric liquid crystal layer. The first conductive film includes a first substrate and a first conductive layer. The second conductive film includes a second substrate and a second conductive layer. The ultraviolet response layer can be prepared on the first conductive film or on the second conductive film. The cholesteric liquid crystal layer is disposed between the first conductive film and the second conductive film, and is located on one side of the ultraviolet response layer.

As an example, one of the first conductive film and the second conductive film is a transparent conductive film, and the other is a dark conductive film. In this embodiment, the first conductive film is a transparent conductive film, the second conductive film is a dark conductive film, the ultraviolet response layer is prepared on the second conductive film, and the cholesteric liquid crystal layer is disposed between the first conductive film and the ultraviolet response layer.

The material of the first substrate is not limited, and is preferably polyethylene terephthalate (PET). Optionally, the material can be other flexible materials or non-flexible transparent materials. The transmittance of the first substrate is preferably 15%~90%, and most preferably 75%~90%.

The material and production process of the first conductive layer are not limited, which can be the conductive materials and processes used in liquid crystal writing boards that are well known to those skilled in the art.

In some preferred examples, the production process of the first conductive film is as follows: a 125 μm PET film is used as the first substrate, and a layer of 200 nm ITO is sputtered to from the first conductive layer by using magnetron sputtering technology in an inert gas (argon) atmosphere.

The material of the second substrate is not limited, which can be any flexible material or non-flexible dark material. The transmittance of the second substrate is preferably 0%~80%, and most preferably 0%~35%.

The material and production process of the second conductive layer are not limited, which can be the conductive materials and processes used in liquid crystal writing boards that are well known to those skilled in the art.

In some preferred examples, the production process of the second conductive film is as follows: a 125 μm dark PET film is used as the second substrate, and a layer of 200 nm ITO is sputtered to form the second conductive layer by using magnetron sputtering technology in an inert gas (argon) atmosphere.

The material of the ultraviolet response layer is not limited, which can be any material that is in a high resistance state, is sensitive to ultraviolet response, or can form a PN junction or Schottky contact with the first conductive layer or the second conductive layer.

The position of the ultraviolet response layer is not limited, which can be on the transparent conductive film or the dark conductive film. Its production process is also not limited, which can be the well-known coating process or spin coating process.

In some preferred examples, the production process of the ultraviolet responsive layer is as follows: a layer of 100 nm zinc oxide layer is sputtered on the second conductive film to form an ultraviolet responsive layer by using magnetron sputtering technology in a mixed atmosphere of oxygen and argon (4:71).

The raw material of the cholesteric liquid crystal layer is liquid crystal slurry, and its main components are cholesteric liquid crystal, spacers, prepolymers, and photoinitiators. The specific components are not limited, which can be materials well known to those skilled in the art.

In some preferred examples, the production process of the cholesteric liquid crystal layer is as follows: the cholesteric liquid crystal, prepolymer, and photoinitiator are stirred and mixed at 40° C. for 5 hours in a mass ratio of 70:28:2, and then 500 nm spacers are mixed with the mixed slurry in 0.4% mass ratio to obtain the liquid crystal slurry.

In this embodiment, the assembling method of the light regulation and control screen is as follows: the liquid crystal slurry is evenly distributed between the first conductive film (transparent conductive film) and the second conductive film (dark conductive film) by extrusion coating or pouring or other common methods. The liquid crystal slurry is cured by ultraviolet irradiation and its edges are sealed by ultraviolet curing glue or other adhesives.

The method of using the liquid regulation and control screen in this embodiment is as follows:

1) Writing mode;

There is no need to apply voltage to the first conductive film and the second conductive film. Under physical squeeze, the cholesteric liquid crystal layer changes from a planar state to a focal conic state, thereby leaving handwriting on the light regulation and control screen and realizing the writing function;

2) Selective erasing mode;

When a bias voltage (continuous low voltage or low voltage pulses) is applied between the first conductive film and the second conductive film, a reverse PN junction structure or Schottky contact is formed between the ultraviolet response layer and the second conductive layer in the second conductive film (dark conductive film), or the ultraviolet response layer itself is in a high resistance state. The circuit is in a non-conductive state in the case of low voltage bias, and the cholesteric liquid crystal layer still maintains the focal conic state. In the case of external ultraviolet irradiation, the ultraviolet response layer exposed to ultraviolet rays is in a conductive state, so that low voltage is applied to the cholesteric liquid crystal layer in the corresponding part, and the liquid crystal state in this part changes from the focal conic state back to the planar state, thus achieving selective handwriting erasure;

3) Global erasing mode;

A bias voltage (high voltage pulses) is applied between the first conductive film and the second conductive film. The higher voltage will breakdown the reverse PN junction or Schottky contact, or there will be a higher voltage in the cholesteric liquid crystal layer according to the partial voltage law. The higher voltage causes the entire liquid crystal in the cholesteric liquid crystal layer to transform into the planar state, thereby achieving full-screen handwriting erasure.

Embodiment 6

This embodiment relates to a specific implementation of the light regulation and control screen of the present invention.

A selective erasing light regulation and control screen includes a first conductive film, a second conductive film, a first ultraviolet response layer, a second ultraviolet response layer and an electronic ink layer. The first conductive film includes a first substrate and a first conductive layer. The second conductive film includes a second substrate and a second conductive layer. The first ultraviolet response layer can be prepared on the first conductive film. The second ultraviolet response layer can be prepared on the second conductive film. The electronic ink layer is disposed between the first ultraviolet response layer and the second ultraviolet response layer.

The material of the first substrate is not limited, and is preferably polyethylene terephthalate (PET). Optionally, the material can be other flexible materials or non-flexible transparent materials.

The material and production process of the first conductive layer are not limited, which can be the conductive materials and processes used in liquid crystal writing boards that are well known to those skilled in the art.

In some preferred examples, the production process of the first conductive film is as follows: a 125 μm PET film is used as the first substrate, and a layer of 200 nm ITO is sputtered to form the first conductive layer by using magnetron sputtering technology in an inert gas (argon) atmosphere.

The material of the second substrate is not limited, and is preferably polyethylene terephthalate (PET). Optionally, the material can be other flexible materials or non-flexible transparent materials. The material and production process of the second conductive layer are not limited, which can be the conductive materials and processes used in liquid crystal writing boards that are well known to those skilled in the art.

In some preferred examples, the production process of the second conductive film is as follows: a 125 µm PET film is used as the second substrate, and a layer of 200 nm ITO is sputtered to form the second conductive layer by using magnetron sputtering technology in an inert gas (argon) atmosphere.

The material of the first ultraviolet response layer is not limited, which can be any material that is in a high resistance state, is sensitive to ultraviolet response, or can form a PN junction or Schottky contact with the first conductive layer.

In some preferred examples, the production process of the first ultraviolet responsive layer is as follows: a layer of 100 nm zinc oxide layer is sputtered on the first conductive film to form an ultraviolet responsive layer by using magnetron sputtering technology in a mixed atmosphere of oxygen and argon (4:71).

The material of the second ultraviolet response layer is not limited, which can be any material that is in a high resistance state, is sensitive to ultraviolet response, or can form a PN junction or Schottky contact with the first conductive layer.

In some preferred examples, the production process of the second ultraviolet responsive layer is as follows: a layer of 100 nm zinc oxide layer is sputtered on the second conductive film to form an ultraviolet responsive layer by using magnetron sputtering technology in a mixed atmosphere of oxygen and argon (4:71).

The material and production process of the electronic ink layer is not limited, which can be commonly used materials and production processes.

In some preferred examples, the production process of the electronic ink layer is as follows: the electronic ink capsules are laid on the second conductive layer to ensure the contact between each electronic ink capsule and electrode, the first conductive film is covered above the electronic ink capsules, and a transparent adhesive is injected between the electronic ink capsules to reduce the distance between the electrodes and the electronic ink capsules.

The method of using the liquid regulation and control screen in this embodiment is as follows:

1) Writing mode;
    The forward voltage is applied to the first conductive film and the second conductive film. Under the action of the first ultraviolet response layer and the second ultraviolet response layer, there is a small electric field of the electronic ink layer, and the display cannot be realized without ultraviolet light irradiation. When there is ultraviolet light irradiation, the first ultraviolet response layer and the second ultraviolet response layer are conducted, and the ions of the corresponding charge in the electronic ink layer move to the top of the electronic ink layer, thereby realizing the display of ultraviolet irradiation handwriting;
2) Selective erasing mode;
    A reverse voltage is applied between the first conductive film and the second conductive film. Under the action of the first ultraviolet response layer and the second ultraviolet response layer, there is a small electric field of the electronic ink layer, and the display cannot be realized without ultraviolet light irradiation. When there is ultraviolet light irradiation, the first ultraviolet response layer and the second ultraviolet response layer are conducted, and the electric field strength of the electronic ink layer is enhanced, thereby realizing the selective erasure.

The above embodiments are merely illustrative of several implementation manners of the present disclosure, and the description thereof is more specific and detailed, but is not to be construed as a limitation to the patentable scope of the present disclosure. It should be pointed out that several variations and improvements can be made by those of ordinary skill in the art without departing from the conception of the present disclosure, but such variations and improvements should fall within the protection scope of the present disclosure. Therefore, the protection scope of the patent of the present disclosure should be subject to the appended claims.

What is claimed is:
1. A light regulation and control screen, including:
   a first conductive structure;
   a second conductive structure, arranged opposite to the first conductive structure;
   a light response structure, disposed between the first conductive structure and the second conductive structure, which is used to be in a non-conductive state in the absence of light irradiation and to be in a conductive state in the case of light irradiation, and the wavelength of light is 200 nm~2,000 nm;
   a bistable display structure, disposed between the first conductive structure and the second conductive structure and located on one side of or inside the light response structure, which is used to be in a selective erasing state under the action of voltage regulation and conductive state of the light response structure;
   wherein, the first conductive structure including:
   a first base layer, wherein, the thickness of the first base layer is 100 µm~1 cm, when the first base layer is made of a light-colored material, the light transmittance of the first base layer is 15%~90%, when the first base layer is made of a dark-colored material, the light transmittance of the first base layer is 0%~80%;
   a first conductive layer, provided on the side of the first base layer close to the second conductive structure, wherein, the thickness of the first conductive layer is 2 nm~100 µm;
   wherein, the second conductive structure including:
   a second base layer, wherein, the thickness of the second base layer is 100 µm~1 cm, when the second base layer is made of a light-colored material, the light transmittance of the second base layer is 15%~90%, when the second base layer is made of a dark-colored material, the light transmittance of the second base layer is 0%~80%;
   a second conductive layer, provided on the side of the second base layer close to the first conductive structure, wherein, the thickness of the second conductive layer is 2 nm~100 µm;
   wherein, wherein the light response structure including:
   a first light response layer, disposed between the first conductive structure and the bistable display structure, wherein, the thickness of the first light response layer is 2 nm~100 µm, the first light response layer is made of photosensitive materials, or materials that forms a rectifying structure with the first conductive layer; and/or, a second light response layer, disposed between the second conductive structure and the bistable display structure, wherein, the thickness of the second light response layer is 2 nm~100 µm, the second light response layer is made of photosensitive materials, or materials that forms a rectifying structure with the second conductive layer; and wherein, the bistable display structure including:

a liquid crystal display layer, disposed between the first conductive structure and the second conductive structure and located on one side of the light response structure or inside the light response structure, which is used to be in a writing state and a global erasing state under the action of voltage regulation and to be in a selective erasing state under the action of voltage regulation and conductive state of the light response structure, wherein, the thickness of the liquid crystal display layer is 10 nm~100 µm; or, an ink display layer, disposed between the first conductive structure and the second conductive structure and located inside the light response structure, which is used to be in a writing state, a global erasing state and a selective erasing state under the action of voltage regulation and conductive state of the light response structure, wherein, the thickness of the ink display layer is 10 nm~100 µm.

2. A method for preparing a light regulation and control screen described in claim 1, comprising the steps of:

preparing the first conductive structure: a first conductive layer is formed on the surface of a first base layer so as to form the first conductive structure;

preparing the second conductive structure: a second conductive layer is formed on the surface of a second base layer so as to form the second conductive structure;

preparing the light response structure: a first light response layer is formed on the surface of the first conductive structure; and, preparing the light regulation and control screen: the first base layer, the first conductive layer, the first light response layer, a liquid crystal display layer, the second conductive layer and the second base layer are assembled to form the light regulation and control screen.

3. A method for preparing a light regulation and control screen described in claim 1, comprising the steps of:

preparing the first conductive structure: a first conductive layer is formed on the surface of a first base layer so as to form the first conductive structure;

preparing the second conductive structure: a second conductive layer is formed on the surface of a second base layer so as to form the second conductive structure;

preparing the light response structure: a first light response layer is formed on the surface of the first conductive structure; and a second light response layer is formed on the surface of the second conductive structure; and, preparing the light regulation and control screen: the first base layer, the first conductive layer, the first light response layer, a liquid crystal display layer, the second light response layer, the second conductive layer and the second base layer are assembled to form the light regulation and control screen.

4. A method for preparing a light regulation and control screen described in claim 1, comprising the steps of:

preparing the first conductive structure: a first conductive layer is formed on the surface of a first base layer so as to form the first conductive structure;

preparing the second conductive structure: a second conductive layer is formed on the surface of a second base layer so as to form the second conductive structure;

preparing the light response structure: a first light response layer is formed on the surface of the first conductive structure; and a second light response layer is formed on the surface of the second conductive structure; and, preparing the light regulation and control screen: the first base layer, the first conductive layer, the first light response layer, an ink display layer, the second light response layer, the second conductive layer and the second base layer are assembled to form the light regulation and control screen.

5. A light regulation and control system, including:

a light regulation and control screen described in claim 1.

6. The light regulation and control system according to claim 5, further including:

a control device, connected to the light regulation and control screen and used to adjust the voltage applied to the light regulation and control screen.

7. The light regulation and control system according to claim 5, further including:

a light regulation and control device, used to emit light to the light regulation and control screen to change the state of the light response structure in the light regulation and control screen, in which the wavelength of the light is 200 nm~2,000 nm.

8. A light regulation and control method, applied to a light regulation and control screen described in claim 1, comprising the steps of:

obtaining a voltage regulation instruction, wherein, the voltage regulation instruction includes a first voltage regulation instruction, a second voltage regulation instruction and a third voltage regulation instruction, the first voltage regulation instruction is used to instruct the application of continuous low voltage or low voltage pulses to the first conductive structure and/or the second conductive structure, the second voltage regulation instruction is used to instruct the application of high voltage pulses to the first conductive structure and/or the second conductive structure, and the third voltage regulation instruction is used to instruct the application of a reverse voltage to the first conductive structure and/or the second conductive structure;

adjusting the voltage applied to a first conductive structure and/or a second conductive structure according to the voltage regulation instruction, to make a bistable display structure to be in selective erasing modes;

when the bistable display structure is in the selective erasing mode, determining whether a light response structure receives light irradiation, in which the wavelength of the light is 200 nm~2,000 nm;

when the light response structure receives light irradiation, the light response structure is in a conductive state, so that the bistable display structure illuminated by light is in a selective erasing state;

when the light response structure does not receive light irradiation, the light response structure is in a non-conductive state, so that the bistable display structure is not in the selective erasing state;

wherein, adjusting the voltage applied to a first conductive structure and/or a second conductive structure according to the voltage regulation instruction, to make a bistable display structure to be in selective erasing modes includes:

after adjusting the voltage applied to the first conductive structure and/or the second conductive structure according to the first voltage regulation instruction, the bistable display structure is used to be in a selective erasing mode;

after adjusting the voltage applied to the first conductive structure and/or the second conductive structure according to the second voltage regulation instruction, the bistable display structure is used to be in a global erasing mode; and after adjusting the voltage applied to the first conductive structure and/or the second conductive structure according to the third voltage regulation instruction, the bistable display structure is used to be in a selective erasing mode.

9. The light regulation and control method according to claim 8, further comprising the steps of:

when the light response structure receives light irradiation, detecting the irradiation range of the light;

according to the irradiation range, the light response structure is divided into a conductive area and a non-conductive area; and, according to the conductive area and the non-conductive area, the bistable display structure is divided into an erasable area and a non-erasable area.

* * * * *